(12) United States Patent
Senoo et al.

(10) Patent No.: US 10,088,674 B2
(45) Date of Patent: Oct. 2, 2018

(54) LASER SCANNING OPTICAL SYSTEM

(71) Applicant: KONICA MINOLTA, INC., Chiyoda-ku (JP)

(72) Inventors: Wataru Senoo, Toyokawa (JP); Hideo Uemura, Toyokawa (JP); Makoto Ooki, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 13/857,784

(22) Filed: Apr. 5, 2013

(65) Prior Publication Data

US 2013/0265627 A1 Oct. 10, 2013

(30) Foreign Application Priority Data

Apr. 6, 2012 (JP) ................................ 2012-086921

(51) Int. Cl.
*G02B 26/10* (2006.01)
*G02B 5/08* (2006.01)
*G02B 26/12* (2006.01)

(52) U.S. Cl.
CPC ........... *G02B 26/10* (2013.01); *G02B 5/0808* (2013.01); *G02B 26/123* (2013.01)

(58) Field of Classification Search
CPC ...... G02B 26/10; G02B 26/123; G02B 27/28; G02B 5/0833; G02B 5/09
USPC ......... 359/201.1, 201.2, 203.1, 204.3, 206.1, 359/207.9, 205.1, 210.1, 216.1, 359/217.1–219.1; 347/243–244, 258–261
See application file for complete search history.

(56) References Cited

U.S. PATENT DOCUMENTS

| | | | |
|---|---|---|---|
| 2002/0041419 A1* | 4/2002 | Takada et al. | 359/204 |
| 2002/0057327 A1* | 5/2002 | Yoshida | 347/233 |
| 2006/0139718 A1* | 6/2006 | Ishihara | 359/205 |
| 2009/0116109 A1* | 5/2009 | Konishi et al. | 359/500 |

(Continued)

FOREIGN PATENT DOCUMENTS

| | | |
|---|---|---|
| JP | 2-35413 | 2/1990 |
| JP | 08327926 A | 12/1996 |

(Continued)

OTHER PUBLICATIONS

Japanese Office Action dated Jul. 29, 2014, in counterpart Japanese Application No. 2012-086921.

*Primary Examiner* — Darryl J Collins
*Assistant Examiner* — Journey Sumlar
(74) *Attorney, Agent, or Firm* — Holtz, Holtz & Volek PC

(57) ABSTRACT

In a laser scanning optical system, at least one of one or more scanning optical elements is made of a material having a photoelastic coefficient equal to or greater than $20 \times 10^{-12}$ $[Pa^{-1}]$; wherein at least one of one or more reflectors comprises a basal plate, and a metal film and a single-layer optical thin film evaporated on the basal plate; wherein the single-layer optical thin film has a thickness greater than $0.15\lambda$ and less than $0.40\lambda$, wherein $\lambda$ is a wavelength of the light beam; and wherein the light beams heading to both ends of an effective scanning range of the imaging surface, of which image heights are maximum, enter the one or more reflectors at angles of incidence equal to or greater than 10 degrees and less than 55 degrees.

9 Claims, 14 Drawing Sheets

(56) References Cited

U.S. PATENT DOCUMENTS

| | | | |
|---|---|---|---|
| 2009/0185826 A1* | 7/2009 | Tanimura | B41J 2/473 399/151 |
| 2010/0309516 A1 | 12/2010 | Naito | |
| 2013/0300868 A1* | 11/2013 | Yamamoto | 348/143 |

FOREIGN PATENT DOCUMENTS

| | | | | |
|---|---|---|---|---|
| JP | 2001337285 A | | 12/2001 | |
| JP | 2002-182143 | | 6/2002 | |
| JP | 2002174787 A | | 6/2002 | |
| JP | 2004279581 A | | 10/2004 | |
| JP | 2005-326744 | | 11/2005 | |
| JP | 2005326744 A | * | 11/2005 | ............ G02B 26/10 |
| JP | 2007156172 A | | 6/2007 | |
| JP | 2009-169248 | | 7/2009 | |
| JP | 2010281996 A | | 12/2010 | |

* cited by examiner

F I G . 5
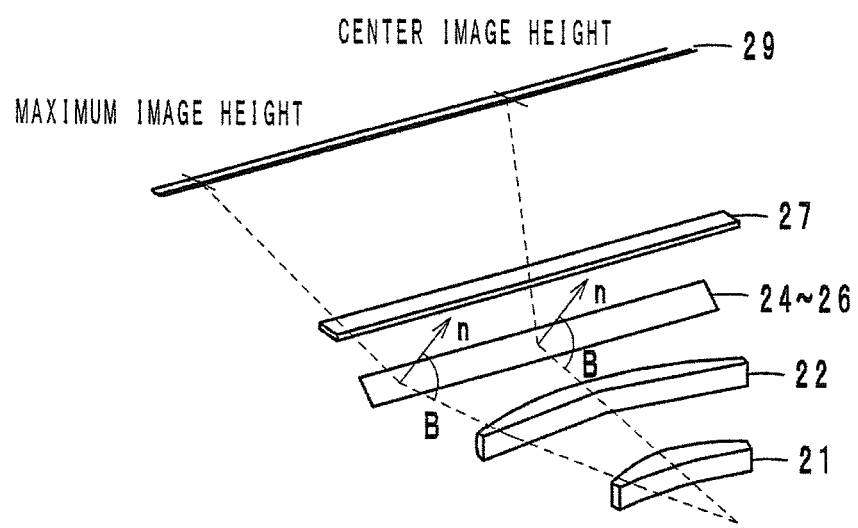

LASER SCANNING OPTICAL SYSTEM

This application is based on Japanese Patent Application No. 2012-086921 filed on Apr. 6, 2012, the content of which is incorporated herein by reference.

BACKGROUND

1. Technical Field

The present invention relates to a laser scanning optical system for deflecting a linearly-polarized light beam so as to scan an imaging surface with the linearly-polarized light beam via at least one scanning optical element.

2. Description of Related Art

In the field of such laser scanning optical systems, conventionally, shading corrections, which are methods for correcting uneven intensity distribution on an imaging surface, have been proposed, for example, by Japanese Patent Laid-Open Publication No. 2-035143, Japanese Patent Laid-Open PublicatiNo.2005-326744, Japanese Patent Laid-Open Publication No. 2002-182143 and Japanese Patent Laid-Open Publication No. 2009-169248. According to the methods proposed by these documents, the polarization state of a light beam entering a scanning optical element is defined, and the transmittance property of the scanning optical element (when the scanning optical element is a lens) or the reflectance property of the scanning optical element (when the scanning optical element is a reflector) is optimized so that the uneven intensity distribution can be suppressed.

If an optically-anisotropic matter is placed in an optical path of a conventional laser scanning optical system, between a deflector and the scanning optical element, the polarization state of the light entering the scanning optical element is mostly different from the polarization state of the light emitted from the light source, due to the birefringence effect of the optically-anisotropic matter.

It is conceivable that the strength of the birefringence effect of the optically-anisotropic matter on the light varies, depending on the state of the optically-anisotropic matter or the position of the optically-anisotropic matter where the light passes, and therefore, it is difficult to accurately estimate the change of the polarization state. Therefore, even in a laser scanning optical system that is so designed that uneven intensity distribution can be suppressed while the light is in an expected polarization state, if the polarization state of the light changes beyond expectation, the uneven intensity distribution may not be suppressed.

SUMMARY

It is an object of the present invention to provide a laser scanning optical system that can suppress shading on an imaging surface even when the laser scanning optical system comprises a scanning optical element made of a material of great birefringence.

In order to attain the object, a laser scanning optical system according to the present invention comprises: a light source for emitting a linearly-polarized light beam; a deflector for deflecting the light beam emitted from the light source; one or more scanning optical elements for focusing the light beam deflected by the deflector on an imaging surface; and one or more reflectors for receiving the light beam that passed through the one or more scanning optical elements and for reflecting the light beam toward the imaging surface.

In the scanning optical system, at least one of the one or more scanning optical elements is made of a material having a photoelastic coefficient equal to or greater than $20 \times 10^{-12}$ [Pa$^{-1}$], and at least one of the one or more reflectors comprises a basal plate, and a metal film and a single-layer optical thin film evaporated on the basal plate.

In a first aspect of the present invention, the single-layer optical thin film has a thickness greater than $0.15\lambda$ and less than $0.40\lambda$, wherein $\lambda$ is a wavelength of the light beam, and the light beams heading to both ends of an effective scanning range of the imaging surface, of which image heights are maximum, enter at least one of the one or more reflectors at angles of incidence equal to or greater than 10 degrees and less than 55 degrees.

In a second aspect of the present invention, the single-layer optical thin film has a thickness D that satisfies a condition $0.18\lambda < D < 0.22\lambda$ or $0.36\lambda < D < 0.41\lambda$, wherein $\lambda$ is a wavelength of the light beam, and the light beams heading to both ends of a effective scanning range of the imaging surface, of which image heights are maximum, enter the at least one of the one or more reflectors at angles of incidence equal to or greater than 55 degrees and less than 69 degrees.

BRIEF DESCRIPTION OF THE DRAWINGS

This and other objects and features of the present invention will be apparent from the following description with reference to the accompanying drawings, in which:

FIG. 5 is a perspective view showing the angle of incidence to the reflector shown by FIG. 3;

DETAILED DESCRIPTION OF THE PREFERRED EMBODIMENTS

Introduction

Figure 1:
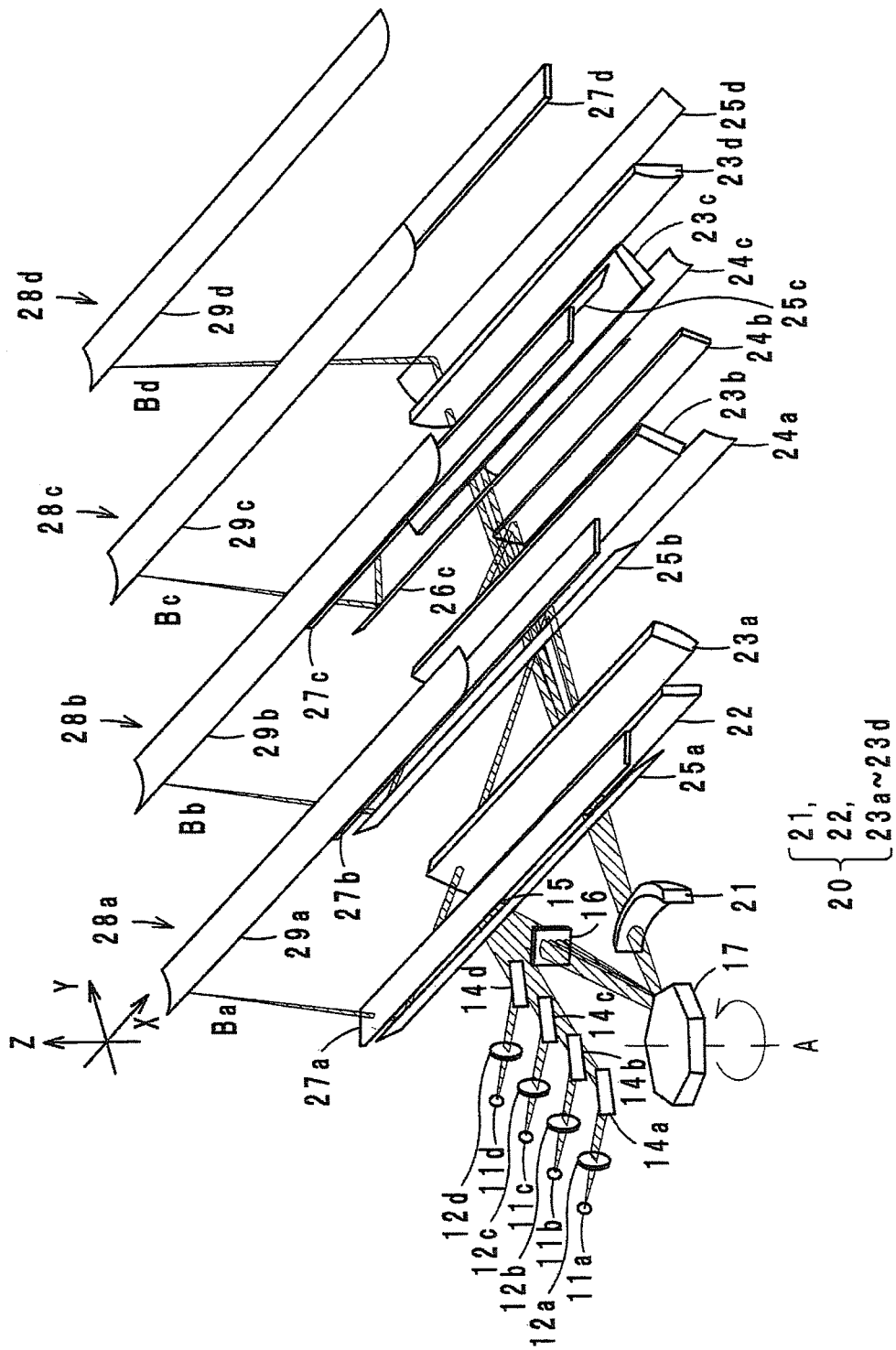
FIG. 1 is a perspective view of a laser scanning optical system according to an embodiment of the present invention.

Laser scanning optical systems according to some embodiments of the present invention will be hereinafter described. In the drawings, X axis indicates a main-scanning direction of a light beam in a laser scanning optical system, Y axis indicates a sub-scanning direction of the light beam, and Z axis indicates a direction perpendicular to both X axis and Y axis. Alphabetical lower-case letters a, b, c and d attached to reference numerals show yellow (Y), magenta (M), cyan (C) and black (Bk), respectively. For example, an imaging surface 29a indicates an imaging surface 29 for yellow. A reference number with no alphabetical letters attached thereto shows a member for each of the colors Y, M, C and Bk. For example, an imaging surface 29 shows an imaging surface for each color.

First Embodiment

A laser scanning optical system according to a first embodiment of the present invention is typically employed in an image forming apparatus, such as an MFP (multi-function peripheral), a monochromatic printer, a copying machine, a color printer, a facsimile or the like. In the image forming apparatus, an electrophotographic process is adopted for image formation, and a tandem method is adopted for a full-color image formation.

Figure 2:
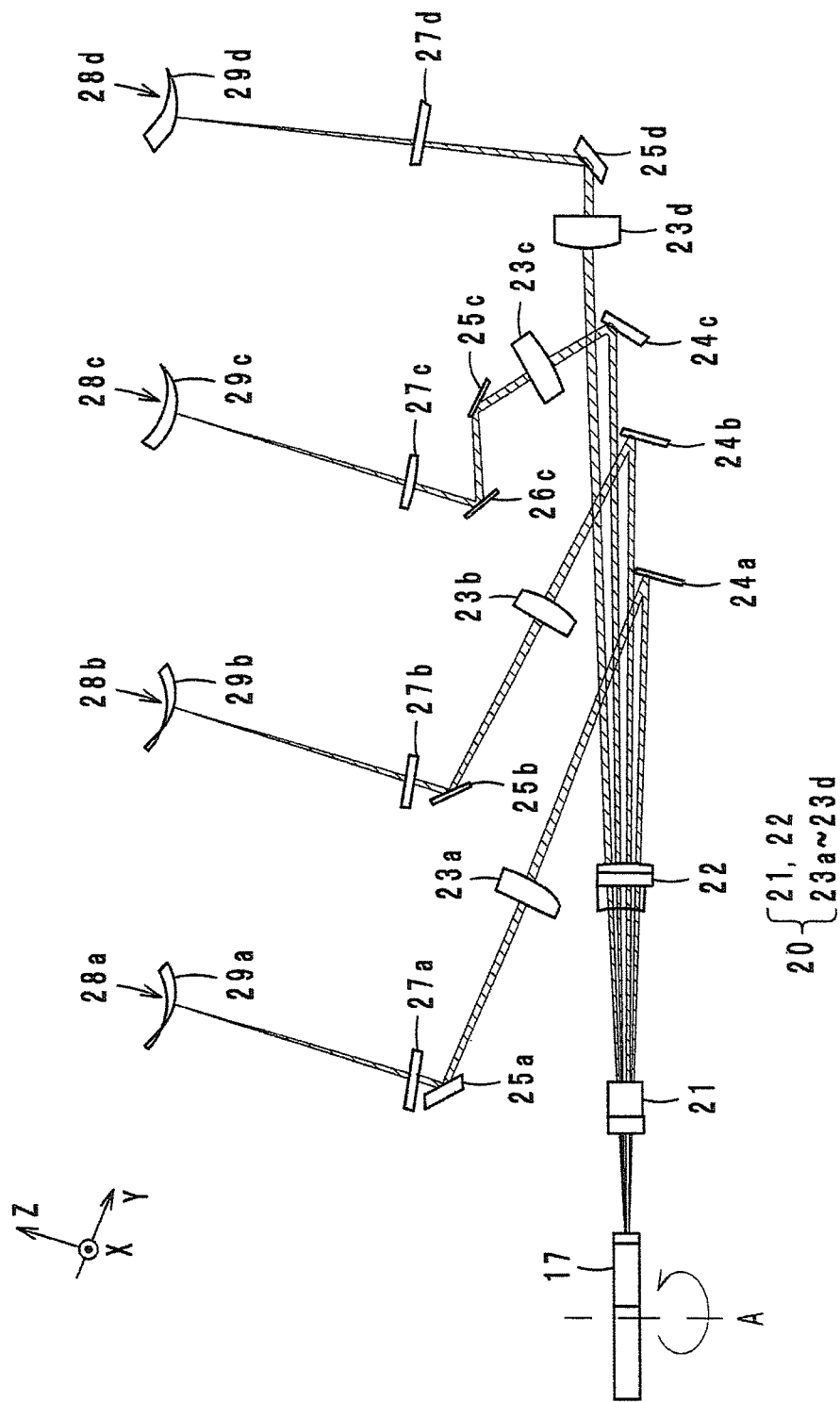
FIG. 2 is a sectional view of the laser scanning optical system shown by FIG. 1, along a central vertical surface parallel to the YZ plane.

As is apparent from FIGS. 1 and 2, the laser scanning optical system adopts a one-sided deflection method, and comprises light sources 11a to 11d, collimator lenses 12a to 12d, combining mirrors 14a to 14d, a mirror 15, a cylindrical lens 16, a deflector 17, a group of scanning optical elements 20, first reflectors 24a to 24c, second reflectors 25a to 25d, a third reflector 26c, dust-proof windows 27a to 27d, and photoreceptor drums 28a to 28d. The photoreceptor drums 28a to 28d have imaging surfaces 29a to 29d, and are driven by motors (not shown) to rotate in the sub-scanning direction. The rotating imaging surfaces 29a to 29d are scanned with light beams Ba to Bd in the main-scanning direction line by line.

Each of the light sources 11 is located at the most upstream in the optical path for the corresponding color, and emits a light beam B. More specifically, when image data for Y is input to the light source 11a, the light source 11a emits a light beam Ba modulated in accordance with the input image data. When image data for M, C and Bk is input to the light sources 11b, 11c and 11d, respectively, the light sources 11b, 11c and 11d emit light beams Bb, Bc and Bd modulated in accordance with the input image data.

Now, preferable conditions for arrangements of the light sources 11 are described. It is preferred that each of the light sources 11 is arranged such that the direction of vibration of the linearly-polarized beam B at the time of entering the scanning lenses 21 to 23 (which will be described later), around their optical axes (i.e. around the COI, which will be described later), is substantially same as the directions of the birefringence axes around the optical axes of the scanning lenses 21 to 23. It is further preferred that each of the light sources 11 is arranged such that the direction of vibration of the linearly-polarized light beam B is substantially same as the rotation axis A of a polygon mirror (which will be described later) of the deflector 17.

The collimator lenses 12a to 12d are arranged subsequent to the respective light sources 11a to 11d to collimate the light beams Ba to Bd into parallel light. Further, diaphragms are provided after the respective collimator lenses 12a to 12d although they are not shown in the drawings. The diaphragms shape the light beams Ba to Bd such that the widths of the light beams Ba to Bd in the sub-scanning direction become a predetermined value.

The combining mirrors 14a to 14d, which are located after the diaphragms for the respective colors, reflect the light beams Ba to Bd that were subjected to the shaping with respect to the sub-scanning direction such that the reflected light beams Ba to Bd travel in the same direction. The mirror 15 is located after the combining mirrors 14a to 14d and reflects the beams Ba to Bd incoming from the same direction. The cylindrical lens 16 transmits and focuses the light beams Ba to Bd such that the light beams Ba to Bd converge linearly around a reflective surface of the polygon mirror of the deflector 17.

The deflector 17 comprises a motor (not shown) as well as the polygon mirror. The polygon mirror is driven by the motor to rotate on the axis A, whereby the light beams Ba to Bd that passed through the cylindrical lens 16 are deflected in the main-scanning direction.

The group of scanning optical elements 20 focuses the light beams Ba to Bd that were deflected by the deflector 17 on the imaging surfaces 29a to 29d. More specifically, the group of scanning optical elements 20 has such optical characteristics as to make the scanning speeds of the imaging surfaces 29a to 29d with the light beams Ba to Bd constant and to make the beam diameters of the light beams Ba to Bd uniform. The group of scanning optical elements 20, which is an example of a plurality of scanning lenses, comprises shared scanning lenses 21 and 22 shared for the colors and dedicated scanning lenses 23a to 23d for the respective colors.

Mainly in terms of cost-reduction, each of the scanning lenses 21 to 23 is made of a material of great birefringence (i.e. a material with a photoelastic coefficient equal to or greater than $20 \times 10^{-12}$ [$Pa^{-1}$]). Also, each of the scanning lenses 21 to 23 has an angle of coverage equal to or greater than 80 degrees. For example, the scanning lenses 21 to 23 are made of thermoplastic resin such as polycarbonate with a photoelastic coefficient of $43 \times 10^{-12}$ [$Pa^{-1}$], and the angles of coverage of the scanning lenses 21 to 23 are 96 degrees.

The scanning lenses 21, 22 and 23a are arranged in this order at downstream side of the deflector 17. Also, the dedicated scanning lenses 23b to 23d are located at downstream side of the shared scanning lens 22. Around the optical axes of the scanning lenses 21 to 23, the axial directions are substantially coincident with the sub-scanning direction.

The first reflectors 24a to 24c are located in the optical paths for Y, M and C, respectively, at downstream side of the shared scanning lens 22. The first reflectors 24a to 24c reflect the light beams Ba to Bc to the dedicated scanning lenses 23a to 23c, respectively.

The second reflectors 25a to 25d are located after the dedicated scanning lenses 23a to 23d, respectively, and reflect the light beams Ba to Bd to the imaging surfaces 29a to 29d, respectively. The light beams Ba, Bb and Bd reflected by the second reflectors 25a, 25b and 25d pass through the dust-proof windows 27a, 27b and 27d, and are imaged on the imaging surfaces 29a, 29b and 29d, respectively. The light beam Bc reflected by the second reflector 25c is further reflected by the third reflector 26c, and thereafter transmits the dust-proof window 27c. Then, the light beam Bc is imaged on the imaging surface 29c.

Details of the Reflectors

Figure 3:
FIG. 3 is a sectional view of a reflector in each embodiment of the present invention.

Each of the reflectors 24 to 26, as shown by the sectional view of FIG. 3, comprises a basal plate 51, a metal film 52 and a single-layer optical thin film 53 evaporated on the basal plate 51. The basal plate 51 is, for example, glass. The metal film 52 is, for example, aluminum or silver. The optical thin film 53 is a single-layer film, i.e., is made of a single material. The material of the optical thin film 53 is typically silicon or magnesium fluoride.

As a representative of the reflectors 24 to 26, the reflector 24 is described in the following. A light beam B as described below enters the reflector 24. The linearly-polarized light beam emitted from the light source 11 includes two polarization components of which directions of vibration are perpendicular to each other, namely, p polarization component and s polarization component. A scanning lens of great birefringence has different refractive indices for different polarization components. Accordingly, there occurs a phase difference between two polarization components that passed through such a scanning lens. Consequently, the polarization direction of a linearly-polarized light beam may change, or the linearly polarization may change to elliptic polarization. Since the birefringence effect of a scanning lens varies depending on the position of the scanning lens, the polarization state of a light beam after passing through the scanning lens varies depending on the position of the scanning lens where the light beam passes. Such a light beam B enters the reflector 24.

In a conventional design of a laser scanning optical system, the polarization state of a light beam entering a reflector is estimated, and reflectance unevenness of the reflector is optimized based on the estimation. However, it has been very difficult to estimate the polarization state of a light beam after passing through a scanning optical element as described above. Even if the polarization state can be estimated rather accurately, there is possibility that the light beam passes through the lens at a position different from the designed position due to assembly errors of the laser scanning optical system, which will cause the light beam to become a different polarization state from the estimated one. Thus, optimization of the laser scanning optical system based on a certain estimation of polarization state may result in greater uneven intensity distribution. In order to suppress uneven intensity distribution on an imaging surface even when the polarization state of the light beam entering the reflector is unpredictable, there has been an idea of using a reflector having an optical thin film that has such reflectance characteristics as to suppress reflectance unevenness even when the incoming light beam is in an arbitrary state of polarization.

In the present embodiment, the reflector 24 is arranged to satisfy the following condition (A) and is configured to satisfy the following condition (B).

(A) The light beams heading to both ends of the effective scanning range of the imaging surface 29, of which image heights are maximum, enter the reflector 24 at angles of incidence equal to or greater than 10 degrees and less than 55 degrees.

(B) The thickness D of the optical thin film 53 is greater than $0.15\lambda$ and less than $0.40\lambda$, wherein $\lambda$ is the wavelength of the light beam.

Figure 4:
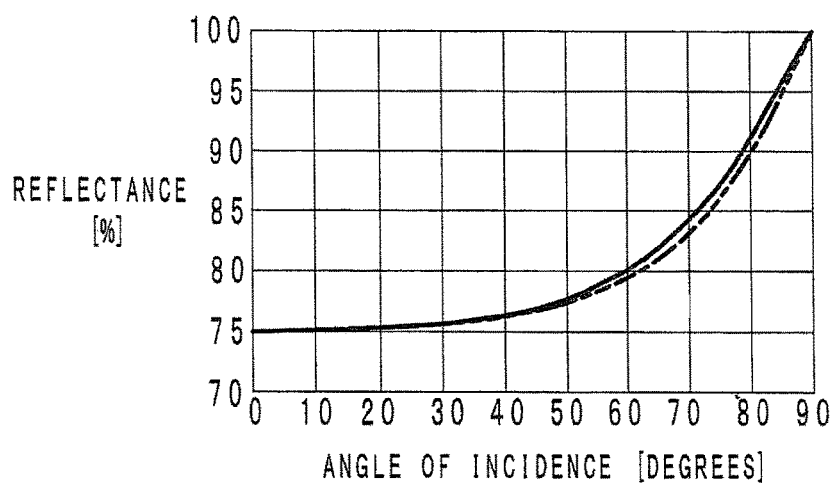
FIG. 4 is a graph showing the reflectance characteristics of the reflector for p-polarized light and for s-polarized light with respect to the angle of incidence thereto.

Now, referring to FIG. 4, the reflectance characteristics of the reflector 24 (with an optical thin film having a thickness D of $0.20\lambda$) for the p polarization component and for the s polarization component with respect to the angle of incidence (which will be hereinafter referred to as incidence angle characteristics) are described. In FIG. 4, the horizontal axis shows angle of incidence, and the vertical axis shows reflectance.

First, the angle of incidence is defined. As shown in FIG. 5, the angle of incidence is an angle at which the light beam B incident to the reflector 24 intersects with a normal vector n. The normal vector n is a vector that takes the position of incidence of the light beam B as a starting point and that is perpendicular to the reflective surface of the reflector 24. The angle of incidence of the light beam B heading to the center image height position of the effective scanning range of the imaging surface 29 is different from the angle of incidence of the light beams B heading to the maximum image height positions.

Due to the incidence angle characteristics as described above, the reflector 24 has reflectance unevenness as shown by FIG. 4. The reflectance unevenness means reflectance differences between the light beams B heading to different positions on a same scanning line on the imaging surface 29. The incidence angle characteristic for the p polarization component and the incidence angle characteristic for the s polarization component are different, and generally, the reflectance is different for different polarization states (different ratios of the p polarization to the s polarization) of the incident light beam.

The reflectance unevenness of the reflector 24 is the greatest in the following cases (C) and (D).

(C) With respect to the two light beams heading to the both ends of the effective scanning range, of which image heights are the maximum, the polarization state of one of the two light beams at the time of entering the reflector 24 is purely the s polarization, while the polarization state of the other of the two light beams at the time of entering the reflector 24 is purely the p polarization.

(D) With respect to the light beam B heading to the center image height position of the effective scanning range, the polarization state at the time of entering the reflector 24 is purely the s polarization.

The case (C) is described. The reflectance unevenness when the angles of incidence to the reflector 24 of the light beams heading to the both ends of the effective scanning range are equal to or greater than 69 degrees and less than 90 degrees is considered as an example. In this example, referring to FIG. 4, the one of the light beams that is purely s-polarized is reflected 100% (maximum reflectance) when the angle of incidence is 90 degrees, and the other of the light beams that is purely p-polarized is reflected 81% (minimum reflectance) when the angle of incidence is 69 degrees. Thus, in this example, the reflectance unevenness (reflectance differences) has the maximum value of 19%. On the contrary, when the angles of incidence to the reflector 24 are less than 55 degrees, the maximum value of the reflectance unevenness becomes smaller. Further, it is never designed that the reflector 24 is used such that light beams enter the reflector 24 at angles of incidence less than 10 degrees. From the considerations, in this embodiment, the angles of incidence to the reflector 24 of the light beams heading to the both ends (the maximum image height positions) of the effective scanning range of the imaging surface 29 are set equal to or greater than 10 degrees and less than 55 degrees.

Figure 6:
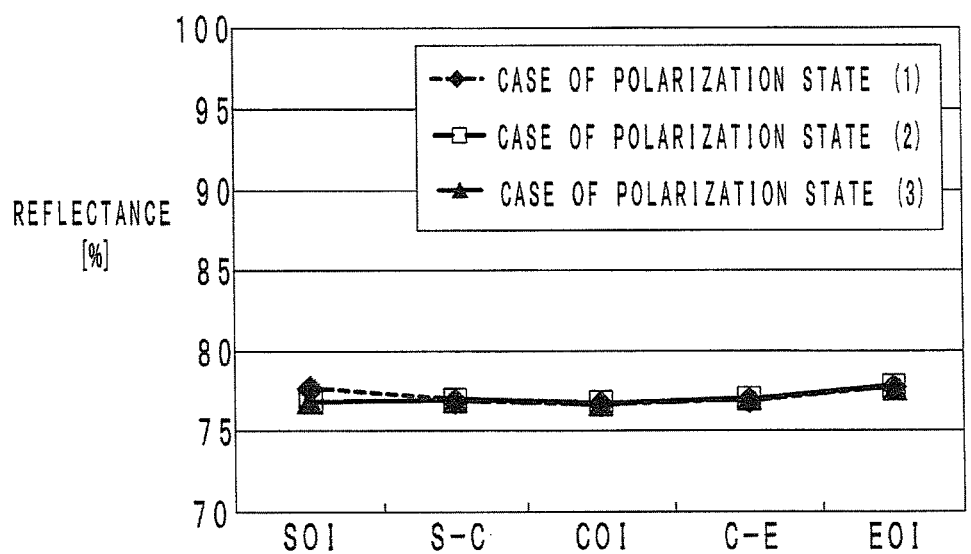
FIG. 6 is a graph showing results of a simulation of reflectance unevenness of the reflector in the first embodiment in different cases of different polarization states of a light beam incident thereto.

FIG. 6 is a graph showing results of a simulation of reflectance unevenness of the reflector 24 in different cases of different polarization states of the light beam B incident thereto. In FIG. 6, the reflectance unevenness in three cases (1) to (3) of different polarization states are shown, and the simulation results show that the reflectance unevenness of the reflector 24 is different depending on the polarization state of a light beam incident thereto. Table 1 shows the cases (1) to (3) of polarization states.

TABLE 1

Polarization State at Each Position of Incidence

| | | Rate of P Polarization | | |
|---|---|---|---|---|
| | | Case (1) | Case (2) | Case (3) |
| Position of Incidence | SOI | 0.50 | 1.00 | 1.00 |
| | S-C | 0.50 | 0.75 | 0.75 |
| | COI | 0.50 | 0.50 | 1.00 |
| | C-E | 0.50 | 0.25 | 0.25 |
| | EOI | 0.50 | 0.00 | 0.00 |

More specifically, Table 1 shows the rates of p polarization at the respective positions of incidence to the reflector 24 of the light beams B as typical examples of the polarization states of the light beams B. In Table 1, the COI (center of imaging) means the position of incidence to the reflector 24 of the light beam B heading to the center image height position and its neighborhood of the effective scanning range of the imaging surface 29. The SOI (start of imaging) and the EOI (end of imaging) mean the positions of incidence to the reflector 24 of the light beams B heading to the maximum image height positions and their neighborhoods of the effective scanning range. Table 1 and FIG. 6 further show the polarization states at positions S-C and C-E. The S-C means the middle position between the SOI and the COI, and the C-E means the middle position between the COI and the EOI.

Table 2 shows the angles of incidence to the reflector 24 of the light beams B the respective positions of incidence thereto. The angles of incidence at the positions SOI and EOI are 51.8 degrees, which satisfies the condition (A).

TABLE 2

Angle of Incidence at Each Position of Incidence

| | | Angle of Incidence (degrees) |
|---|---|---|
| Position of Incidence | SOI | 51.8 |
| | S-C | 48.1 |
| | COI | 45.4 |
| | C-E | 48.1 |
| | EOI | 51.8 |

Figure 7:
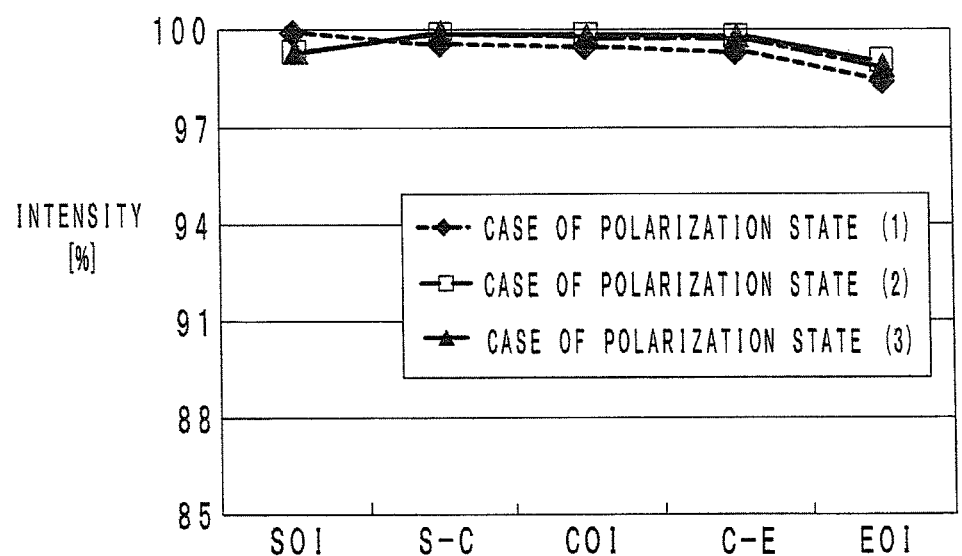
FIG. 7 is a graph showing results of a simulation of uneven intensity distribution on an imaging surface in the different cases of different polarization states of the light beam incident to the reflector in the first embodiment.
Figure 8:
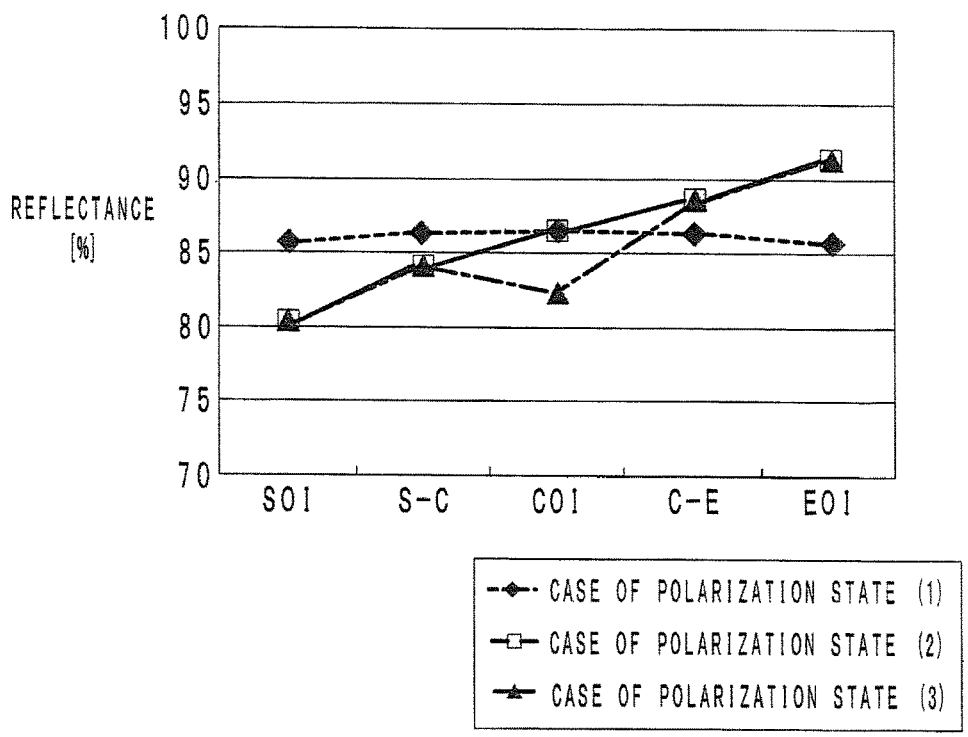
FIG. 8 is a graph showing results of a simulation, which was conducted by using a laser scanning optical system comprising a reflector of a comparative example, of reflectance unevenness of the reflector in the different cases of different polarization states of a light beam incident to the reflector of the comparative example.
Figure 9:
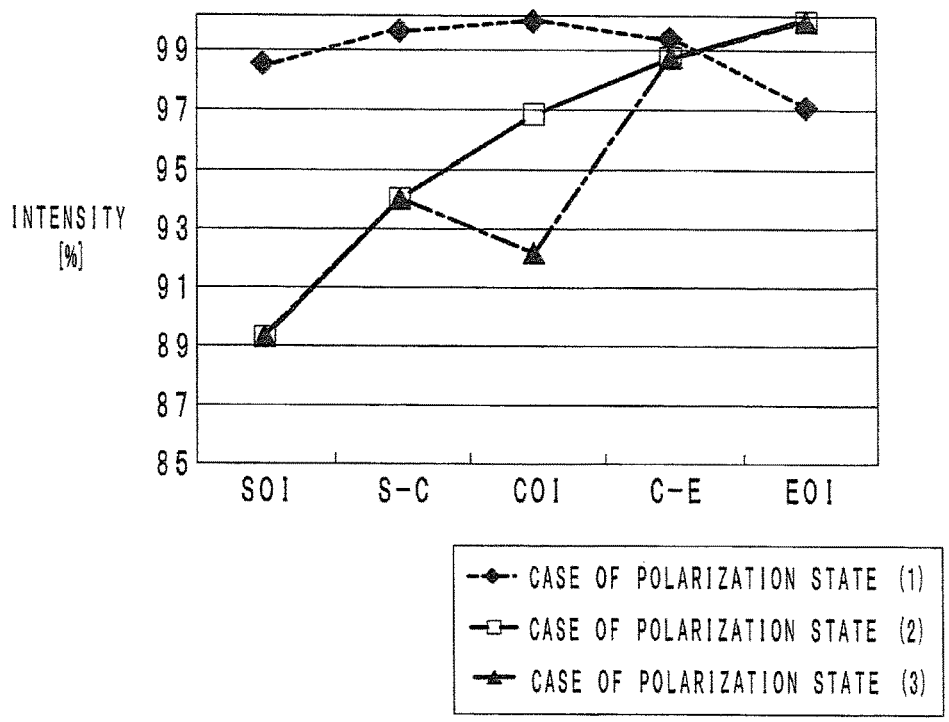
FIG. 9 is a graph showing results of a simulation, which was conducted by using the laser scanning optical system comprising the reflector of the comparative example, of uneven intensity distribution on an imaging surface in the different cases of different polarization states of a light beam incident to the reflector of the comparative example.

FIG. 7 is a graph showing results of a simulation of uneven intensity distribution on the imaging surface 29 in different cases of different polarization states of the light beam B incident to the reflector 24. FIGS. 8 and 9 are graphs showing results of simulations of a laser scanning optical system employing reflectors of a comparative example instead of the reflectors 24 in the present embodiment. Specifically, FIG. 8 shows results of a simulation of reflectance unevenness of a reflector of the comparative example, and FIG. 9 shows results of a simulation of uneven intensity distribution on an imaging surface in different cases of different polarization states of a light beam incident to the reflector. As will be seen from the comparisons of FIGS. 6 and 7, which show the characteristics of the reflectors 24 in the present embodiment, with FIGS. 8 and 9, which show the characteristics of the reflectors of the comparative example, the reflectance unevenness of the reflectors 24 in the present embodiment and the uneven intensity distribution on the imaging surface 29 in the present embodiment are smaller.

Figure 10:
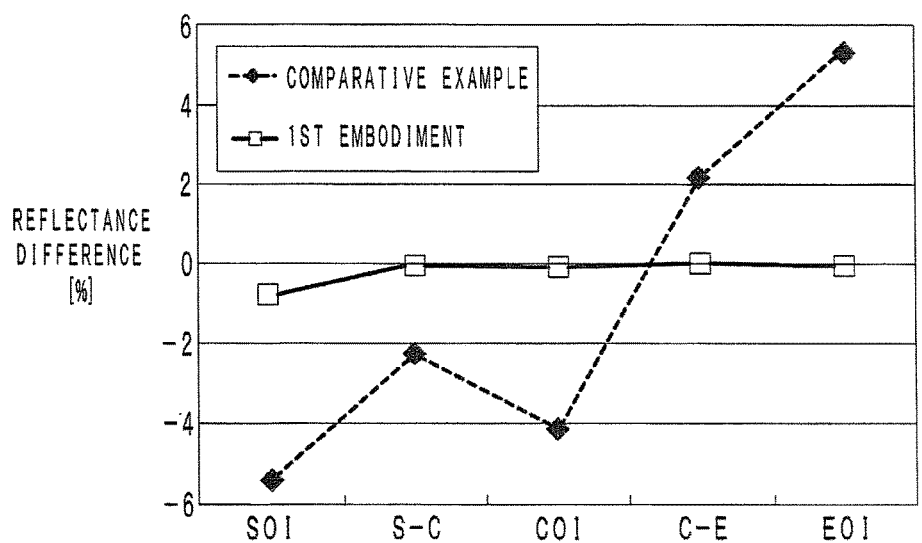
FIG. 10 is a graph showing other results of the simulation of reflectance unevenness of the reflector in the first embodiment and the simulation of reflectance unevenness of the reflector of the comparative example, the graph showing the variability of the reflectance difference between different cases of different polarization states.

FIG. 10 is a graph showing other results of the simulations of reflectance unevenness of the reflector 24 in the present embodiment and reflectance unevenness of the reflector of the comparative example. More specifically, with respect to each of the reflector 24 and the reflector of the comparative example, the variability of the reflectance difference between the case of polarization state (1) and the case of polarization state (3) is shown. As is apparent from FIG. 10, the reflectance difference of the reflector 24 between different polarization states varies less with changes in position of incidence, compared with the reflector of the comparative example.

As described above, by setting the angles of incidence to the reflector 24 of the light beams heading to the both ends (maximum image height positions) of the effective scanning range of the imaging surface 29 to be equal to or greater than 10 degrees and less than 55 degrees, the reflectance unevenness of the reflector 24 can be minimized.

Figure 11:
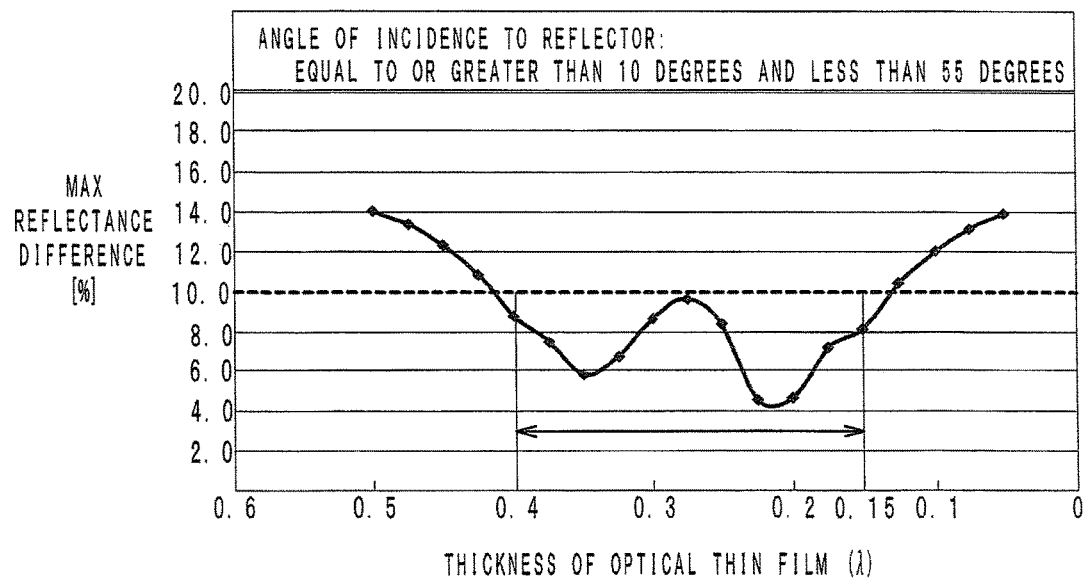
FIG. 11 is a graph showing results of a simulation of reflectance unevenness of the reflector in the first embodiment with the thickness of an optical thin film of the reflector varied while the angle of incidence to the reflector is kept equal to or greater than 10 degrees and less than 55 degrees, the graph showing the maximum reflectance difference in each case of different thicknesses of the optical thin film.

The inventors simulated the reflectance of the reflector with the thickness D of the optical thin film 53 varied, and FIG. 11 shows the simulation results, specifically the maximum reflectance difference. The simulation results of FIG. 11 show that the thickness D should be set greater than $0.15\lambda$ and less than $0.40\lambda$ so as to keep the reflectance unevenness at low level not more than 10%.

Operation and Effect of the First Embodiment

According to the first embodiment, when the reflectors 24 to 26, each having a metal film 52 and a single-layer optical thin film 53, are used, the thickness D of the optical thin film 53 is set greater than $0.15\lambda$ and less than $0.40\lambda$ (see the condition (B)). Further, the angles of incidence to each of the reflectors 24 to 26 of the light beams B heading to the both ends of the effective scanning range of the imaging surface 29 are set equal to or greater than 10 degrees and less than 55 degrees (see the condition (A)). Even when the scanning lenses 21 to 23 made of a material of great birefringence are used as scanning optical elements, which causes the light beams B to vary in polarization state, the reflectance unevenness of the reflectors 24 to 26 can be kept at low level not more than 10% as long as the two conditions (A) and (B) are satisfied. Accordingly, the optical intensity unevenness on the imaging surface 29 can be kept at low level.

Also, the difference between the reflectance for p-polarized light and the reflectance for s-polarized light with the angles of incidence to each of the reflectors 24 to 26 equal to or greater than 10 degrees and less than 55 degrees can be kept small, compared with a conventional scanning optical system. Accordingly, even when the light beams B passing through each of the scanning optical elements at different positions vary in polarization state due to birefringence distributions of the scanning optical elements, which causes the light beams B entering each of the reflectors 24 to 26 at different angles of incidence to vary in ratio of p polarization to s polarization, the reflectance unevenness can be suppressed.

In the first embodiment, additionally, each of the light sources 11 is located such that the direction of vibration of the linearly-polarized light beam B entering the scanning lenses 21 to 23, around the COI, is substantially parallel to the direction of the birefringence axis around the optical axis. With this arrangement, around the optical axis of each of the scanning lenses, birefringence causes no change in polarization state of the light beam B, and the polarization state of the light beam B heading to the center image height position in the effective scanning range on the imaging surface 29 at the time of entering the corresponding reflector 24 to 26 can be estimated. Accordingly, partial optimization for correction of uneven intensity distribution on the imaging surface 29 becomes possible. This effect can be achieved in the following second and third embodiments also.

It is known that, generally, the directions of birefringence axes around the optical axes of the scanning lenses 21 to 23 are substantially same as the sub-scanning direction. Therefore, in the first embodiment, each of the light sources 11 is arranged such that the direction of vibration of the linearly-polarized light beam is substantially parallel to the axis of rotation A (which will be described later) of the polygon mirror of the deflector 17. Accordingly, at the respective times when the linearly-polarized light beam B heading to the center image height position in the effective scanning range on the imaging surface 29 enters the scanning lenses 21 to 23, the directions of vibration of the light beam B are substantially parallel to the directions of the birefringence axes around the optical axes of the scanning lenses 21 to 23. Accordingly, no change in polarization state due to birefringence occurs to the light beam B heading to the center image height position in the effective scanning range of the imaging surface 29, and the light beam B enters to the reflectors 24 to 26 while keeping the direction of vibration of the linearly-polarized light substantially in parallel to the entrance faces of the reflectors 24 to 26.

That the direction of vibration of the linearly-polarized light is substantially parallel to the entrance faces means that the light beam B entering thereto is almost purely a p-polarized component. Therefore, the reflectance at which the reflectors 24 to 26 reflect the light beam B heading to the center image height position in the effective scanning range of the imaging surface 29 is almost the reflectance of the reflectors 24 to 26 for p-polarized light. The reflectance is close to a mean value of a possible range of reflectance at which the reflectors 24 to 26 reflect the light beams heading to positions other than the center image height position and its neighborhood (a mean value in the range from the reflectance for s-polarized light the reflectance for p-polarized light). Therefore, it is possible to suppress uneven intensity distribution on the imaging surface 29, that is, suppress differences in light quantity of positions other than the center image height position and its neighborhood from the center image height position and its neighborhood. This effect can be achieved in the following second and third embodiments also.

In the first embodiment, three scanning lenses 21 to 23 are provided in one optical path, and each of the scanning lenses 21 to 23 is made of a material with a photoelastic coefficient equal to or greater than $20\times10^{-12}$ [Pa$^{-1}$]. In this case, changes in polarization state due to birefringence effect are great, and it is very difficult to estimate the changes. Under these conditions, it is very effective to use the reflectors 24 to 26 as described above. Further, if two scanning lenses of two or more scanning lenses 21 to 23 have photoelastic coefficients equal to or greater than $20\times10^{-12}$ [Pa$^{-1}$], it is difficult to estimate changes in polarization state, and therefore, it is effective to use the reflectors 24 to 26 as described in connection with the first embodiment. This applies to the following second embodiment.

In the first embodiment, the angles of field of the scanning lenses 21 to 23 are equal to or greater than 80 degrees. In this case, the possible angle of incidence is in a wide range, and reflectance unevenness due to birefringence is more likely to occur. This applies to the following second and third embodiments.

The laser scanning optical system according to the first embodiment has a plurality of light sources 11 and a plurality of imaging surfaces 29, and an optical path is formed for each combination of a light source 11 and an imaging surface 29. Whether the shared scanning lenses 21 and 22 for all the optical paths are arranged or not, the polarization states of light beams traveling in the different optical paths change due to birefringence in different ways from each other. Therefore, it is effective to use the reflectors 24 to 26 as described in connection with the first embodiment in one or more of the optical paths. Using the reflectors 24 to 26 in the optical paths is effective also when the incident beams to the deflector 17 are at angles to the sub-scanning direction. This applies to the following second embodiment.

Second Embodiment

In the first embodiment, the reflectors 24 to 26 are used in a laser scanning optical system that adopts a one-sided deflection method. However, it is also possible to use the reflectors 24 to 26 in a laser scanning optical system that adopts a two-sided deflection method as shown in FIGS. 12 and 13, and in this case also, reflectance unevenness and uneven intensity distribution can be suppressed.

Figure 12:
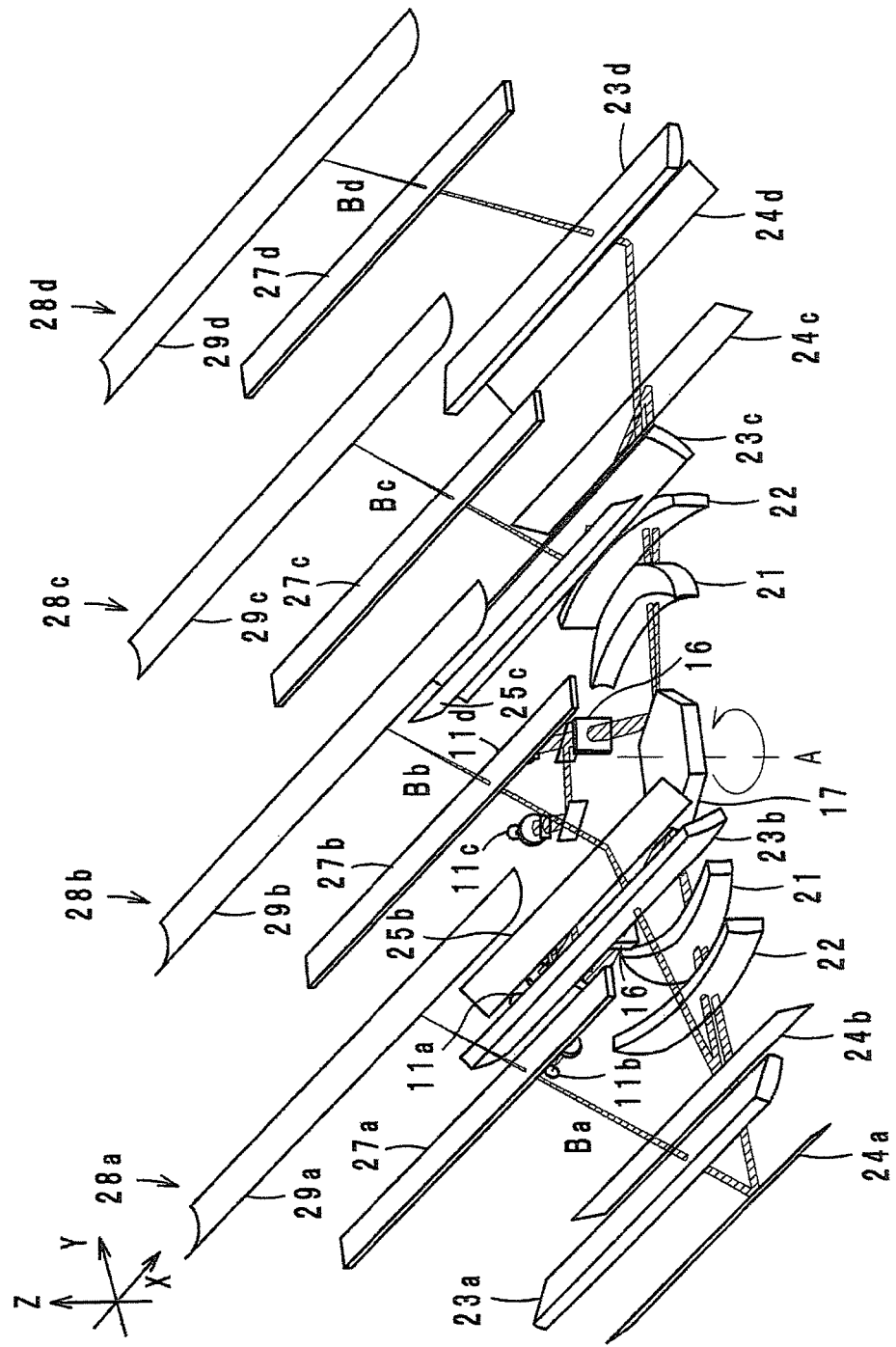
FIG. 12 is a perspective view of a laser scanning optical system according to a second embodiment of the present invention.
Figure 13:
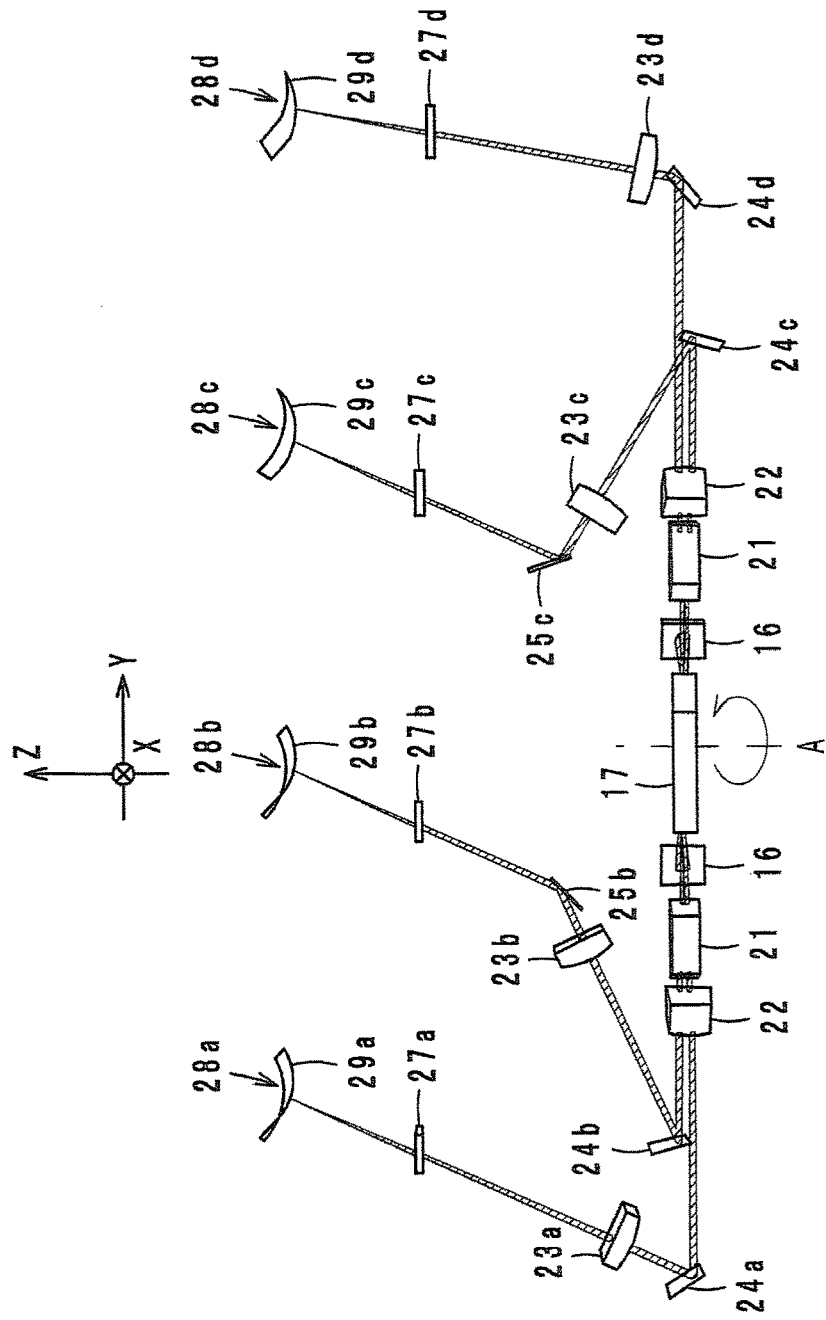
FIG. 13 is a sectional view of the laser scanning optical system shown by FIG. 12, along a central vertical surface parallel to the YZ plane.

In FIGS. 12 and 13, only the essential parts are provided with referential marks, and parts corresponding to the parts shown in FIGS. 1 and 2 are provided with the same referential marks, and descriptions of these parts are omitted.

In the laser scanning optical system adopting a two-sided deflection method, the elements are arranged, for example, such that the optical path for the light beam Ba and the optical path for the light beam Bd are formed substantially symmetrically with respect to a surface including the axis of rotation A of the deflector 17 and such that the optical path for the light beam Bb and the optical path for the light beam Bc are formed substantially symmetrically with respect to the surface including the axis of rotation A. In the following paragraphs, therefore, only a description of the optical paths Ba and Bb is given, and a description of the optical paths Bc and Bd is omitted.

Referring to FIGS. 12 and 13, the light beams Ba and Bb emitted from the light sources 11a and 11b enter the polygon mirror of the deflector 17 via the cylindrical lens 16 and other elements.

The deflector 17 deflects the incident beams Ba and Bb in the main-scanning direction by use of one of the surfaces of the polygon mirror. The shared scanning lenses 21 and 22 are located in the optical paths Ba and Bb after the deflector 17, and located upstream and downstream, respectively, of each other. The dedicated scanning lenses 23a and 23b are arranged in the respective optical paths for the light beams Ba and Bb, downstream of the shared scanning lens 22.

The first reflectors 24a and 24b are located in the optical paths for the light beams Ba and Bb, after the shared scanning lens 22 and upstream of the respective dedicated scanning lenses 23a and 23b. The second reflector 25b is located downstream of the dedicated scanning lens 23b.

The first reflectors 24a and 24b receive the light beams Ba and Bb, respectively, that passed through the shared scanning lens 22, and reflect the incident light beams Ba and Bb toward the dedicated scanning lenses 23a and 23b, respectively. The light beam Ba, after passing through the dedicated scanning lens 23a, passes through the dust-proof window 27a and is focused on the imaging surface 29a. The light beam Bb, after passing through the dedicated scanning lens 23b, passes through the dust-proof window 27b and is focused on the imaging surface 29b.

Details of the Reflectors

Figure 14:
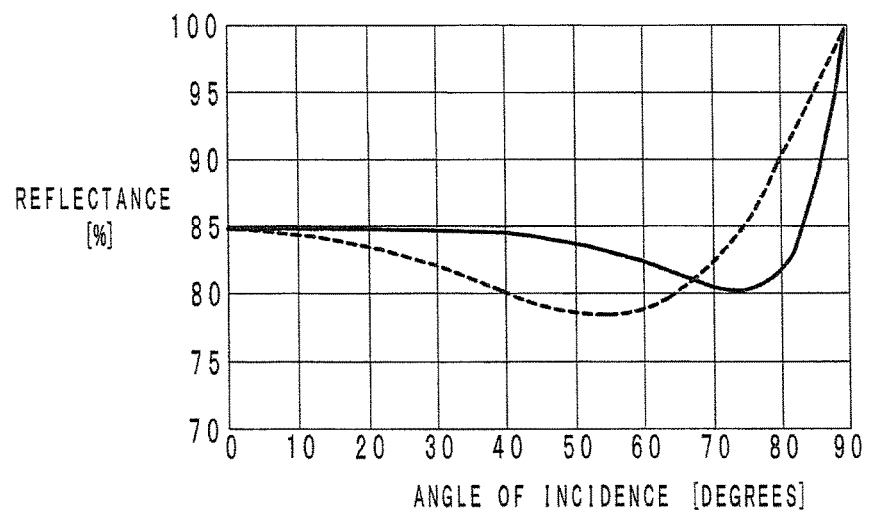
FIG. 14 is a graph showing the reflectance characteristics of a reflector in the second embodiment for p-polarized light and for s-polarized light with respect to the angle of incidence thereto.

In the second embodiment also, the reflectors 24 and 25 are formed and arranged in such a manner to satisfy the conditions (A) and (B). Now referring to FIG. 14, the reflectance characteristics of the reflectors 24 and 25 for p-polarized light and for s-polarized light with respect to the angles of incidence thereto (which will be hereinafter referred to as incidence angle characteristics) are described. In the graph of FIG. 14, the x-axis shows angle of incidence, and the y-axis shows reflectance. The optical thin films 53 of the reflectors 24 and 25 have thicknesses of 0.375λ.

In the case of FIG. 14, even under the condition (C) that causes the maximum reflectance unevenness of the reflector 24, if the angles of incidence of the beams heading to the both ends of the effective scanning range are less than 55 degrees, the reflectance unevenness can be relatively suppressed. Also, it is never designed that the reflectors 24 and 25 are used such that light beams enter the reflectors 24 and 25 at less than 10 degrees. From the considerations, in the second embodiment also, the angles of incidence to the reflectors 24 and 25 of the light beams heading to the both ends (the maximum image height positions) of the effective scanning range of the imaging surface 29 are set equal to or greater than 10 degrees and less than 55 degrees.

Figure 15:
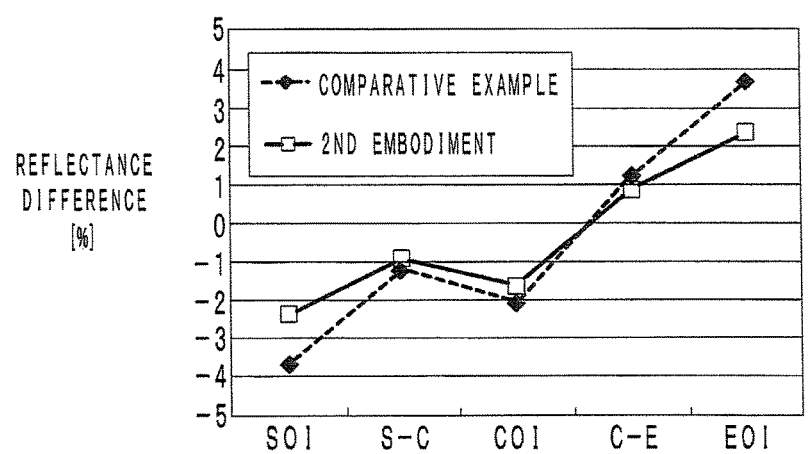
FIG. 15 is a graph showing results of a simulation of reflectance unevenness of the reflector in the second embodiment and the simulation of reflectance unevenness of a reflector of a comparative example, the graph showing the variability of the reflectance difference between different cases of different polarization states.

FIG. 15 is a graph showing results of a simulation of reflectance unevenness of the reflector 24 according to the second embodiment and results of a simulation of reflectance unevenness of the reflector of the comparative example (refer to the first embodiment). FIG. 15 shows, with respect to each of the reflector 24 and the reflector of the comparative example, the variability of reflectance difference between the reflectance for the case of polarization state (1) shown in Table 1 and the reflectance for the case of polarization state (3) shown in Table 1. Table 3 below shows the angles of incidence of the light beams B to the reflector 24 and to the reflector of the comparative example in the simulation.

TABLE 3

Angle of Incidence at Each Position of Incidence

| | | Angle of Incidence (degrees) |
|---|---|---|
| Position of | SOI | 42.794 |
| Incidence | S-C | 35.455 |
| | COI | 32.729 |
| | C-E | 35.743 |
| | EOI | 42.851 |

As is apparent from FIG. 15, the reflectance difference of the reflector 24 in the second embodiment between different polarization states varies less with changes in position of incidence, compared with the reflector of the comparative example.

As has been described with reference to FIG. 11 in the description of the first embodiment, in order to suppress the reflectance unevenness within 10%, the thickness D of the optical thin film 53 shall be set greater than 0.15λ and less than 0.40λ.

Function and Effect of the Second Embodiment

Similarly to the first embodiment, in the second embodiment also, by suppressing the reflectance unevenness of the reflectors 24 to 26 within 10%, it is possible to reduce the uneven intensity distribution on the imaging surface.

Third Embodiment

Figure 16:
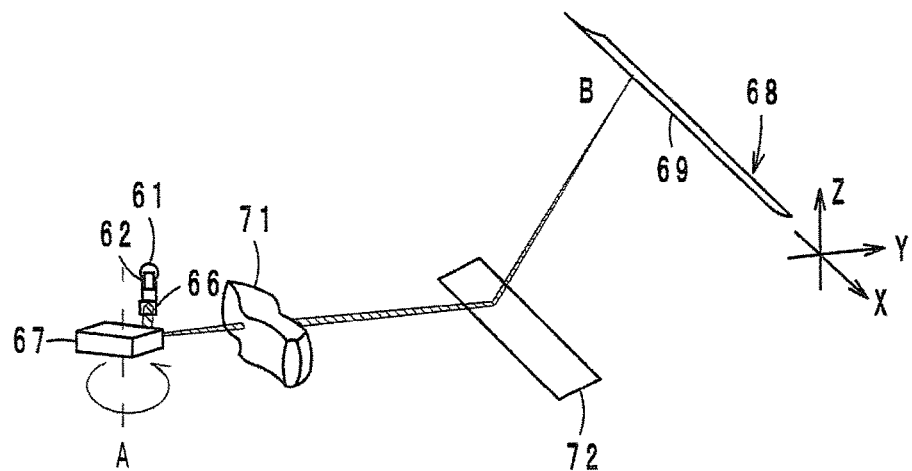
FIG. 16 is a perspective view of a laser scanning optical system according to a third embodiment of the present invention.
Figure 17:
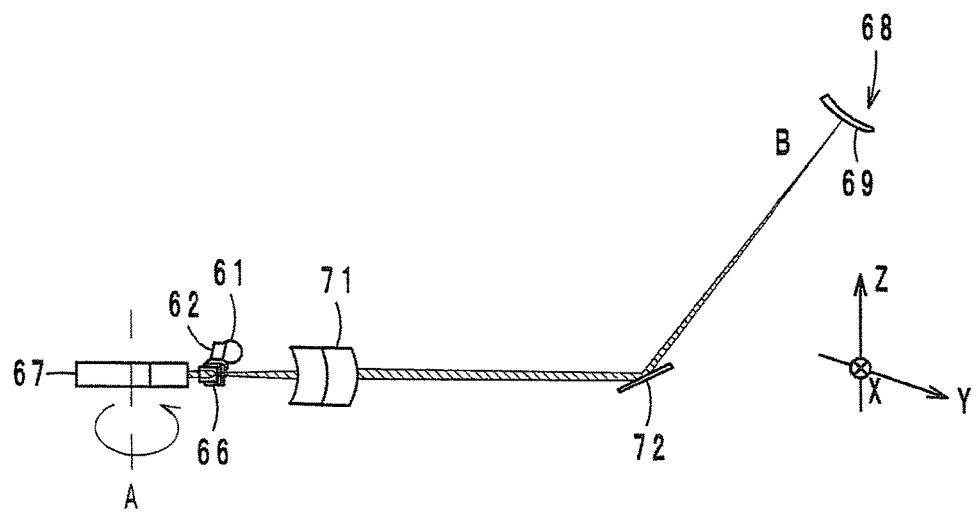
FIG. 17 is a sectional view of the laser scanning optical system shown by FIG. 16, along a central vertical surface parallel to the YZ plane.

A laser scanning optical system according to a third embodiment is typically used in an image forming apparatus such as a monochromatic printer. As shown by FIGS. 16 and 17, the laser scanning optical system roughly comprises a light source 61, a collimator lens 62, a cylindrical lens 66, a deflector 67, a single scanning lens 71, a reflector 72 and a photoreceptor drum 68. The photoreceptor drum 68 has an imaging surface 69 and is driven by a motor (not shown) to rotate in a sub-scanning direction. The imaging surface 69, while rotating, is scanned with a light beam B, which will be described below, line by line in a main-scanning direction.

The light source 61 is located most upstream in a single optical path and emits the light beam B. More specifically, when image data is input to the light source 11, the light source 11 emits a light beam B modulated in accordance with the input image data.

The desirable locational conditions of the light source 61 are same as the desirable locational conditions of the light source 11 in the first embodiment.

The collimator lens 62 is located downstream of the light source 61 and collimates the light beam B. The cylindrical lens 66 focuses the collimated light beam B linearly on a reflective surface of a polygon mirror of the deflector 67. The deflector 67 comprises a motor (not shown) as well as the polygon mirror. In the deflector 67, the polygon mirror is driven by the motor to rotate on an axis A, whereby the light beam B entering from the cylindrical lens 66 is deflected in the main-scanning direction.

The scanning lens 71 has such optical characteristics as to make the light beam B entering from the deflector 67 have a constant scanning speed and have a constant diameter. The scanning lens 71 is made of a material of great birefringence (i.e. having a photoelastic coefficient equal to or greater than $20 \times 10^{-12}$ [$Pa^{-1}$]) mainly in view of reduction of cost. The angle of field of the scanning lens 71 is 80 degrees or more. A specific example of the scanning lens 71 is made of thermoplastic resin such as polycarbonate with a photoelastic coefficient of $43 \times 10^{-12}$ [$Pa^{-1}$], and has an angle of field of 96 degrees.

When the light beam B that passed through the scanning lens 71 enters the reflector 72, the reflector 72 reflects the light beam B toward the imaging surface 69 so that the light beam B is focused on the imaging surface 69.

Details of the Reflector

In analogy with the reflector 24 in the first embodiment, the reflector 72 comprises a basal plate 51, a metal film 52 and a single-layer optical thin film 53 evaporated on the basal plate 51 (see FIG. 3).

In the third embodiment, the reflector 72 satisfies the following conditions (A') and (B').

(A') The light beams B heading to both ends of the effective scanning range of the imaging surface 69, of which image heights are maximum, enter the reflector 72 at angles of incidence equal to or greater than 55 degrees and less than 69 degrees.

(B') The thickness D of the optical thin film 53 is greater than $0.18\lambda$ and less than $0.22\lambda$, wherein $\lambda$ is the wavelength of the light beam.

Now, referring to FIG. 4, the reflectance characteristics of the reflector 72 (with an optical thin film having a thickness D of $0.20\lambda$) for the p polarization component and for the s polarization component with respect to the angles of incidence (which will be hereinafter referred to as incidence angle characteristics) are described. Due to the incidence angle characteristics as described above, the reflector 72 has reflectance unevenness. The reflectance unevenness of the reflector 72 is the greatest in the cases (C) and (D) described in connection with the first embodiment.

The case (C) is described in detail. When the angles of incidence to the reflector 72 of the light beams heading to the both ends of the effective scanning range are equal to or greater than 55 degrees and less than 69 degrees, the reflectance unevenness is kept small, compared with a case wherein the angles of incidence to the reflector 72 of the light beams heading to the both ends of the effective scanning range are equal to or greater than 69 degrees. In the third embodiment, therefore, the angles of incidence to the reflector 72 of the light beams heading to the both ends (the maximum image height positions) of the effective scanning range of the imaging surface 69 are set equal to or greater than 55 degrees and less than 69 degrees.

Figure 18:
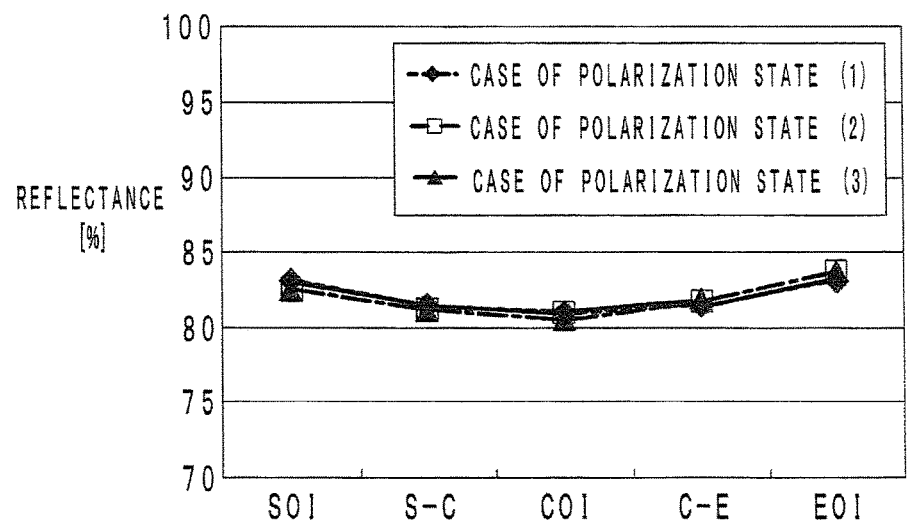
FIG. 18 is a graph showing results of a simulation of reflectance unevenness of a reflector in the third embodiment in different cases of different polarization states of a light beam incident thereto.

FIG. 18 is a graph showing results of a simulation of reflectance unevenness of the reflector 72 in different cases of different polarization states of a light beam incident to the reflector 72. In FIG. 18, the reflectance unevenness in three cases (1) to (3) of different polarization states are shown, and the simulation results show that the reflectance unevenness of the reflector 72 are different among different cases of different polarization states. The cases (1) to (3) of polarization states are as shown by Table 1.

Table 4 below shows the angle of incidence to the reflector 72 of the light beam B at each position of incidence.

TABLE 4

Angle of Incidence at Each Position of Incidence

|  |  | Angle of Incidence (degrees) |
|---|---|---|
| Position of Incidence | SOI | 68.5 |
|  | S-C | 65.4 |
|  | COI | 63.5 |
|  | C-E | 65.4 |
|  | EOI | 68.5 |

Figure 19:
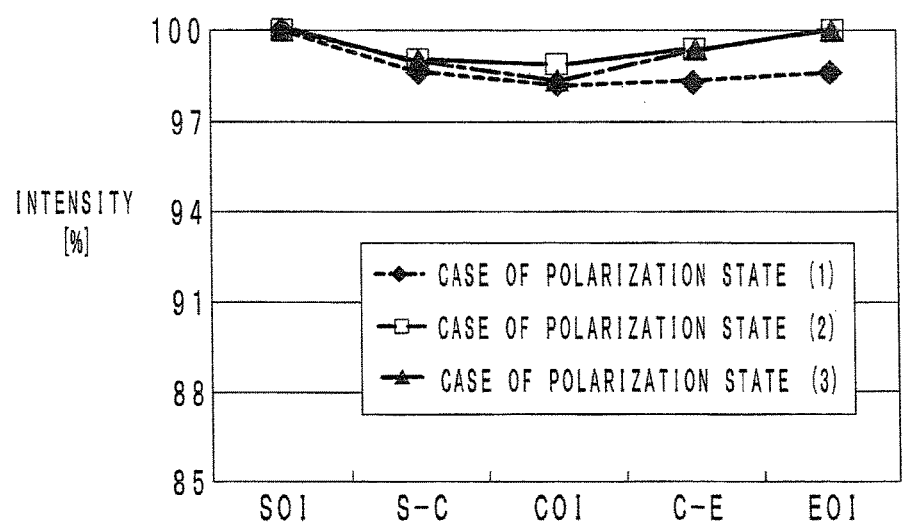
FIG. 19 is a graph showing results of a simulation of uneven intensity distribution on an imaging surface in the third embodiment in different cases of different polarization states of a light beam incident to the reflector in the third embodiment.
Figure 20:
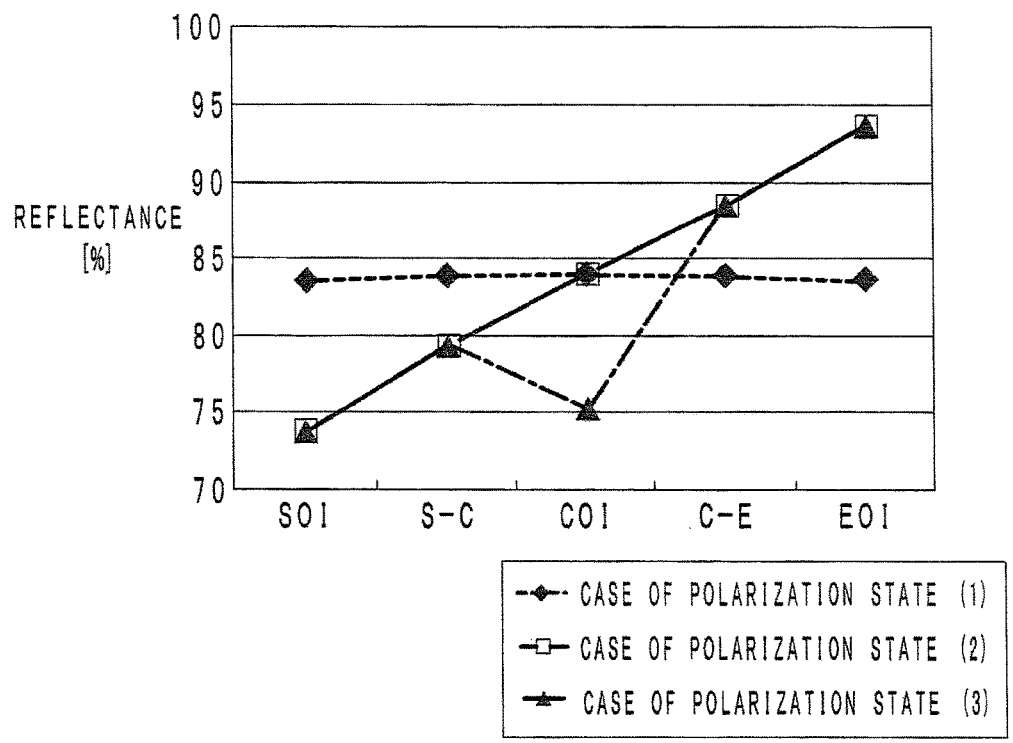
FIG. 20 is a graph showing results of a simulation, which was conducted by using a laser scanning optical system comprising a reflector of a comparative example, of reflectance unevenness of the reflector in different cases of different polarization states of a light beam incident to the reflector of the comparative example.
Figure 21:
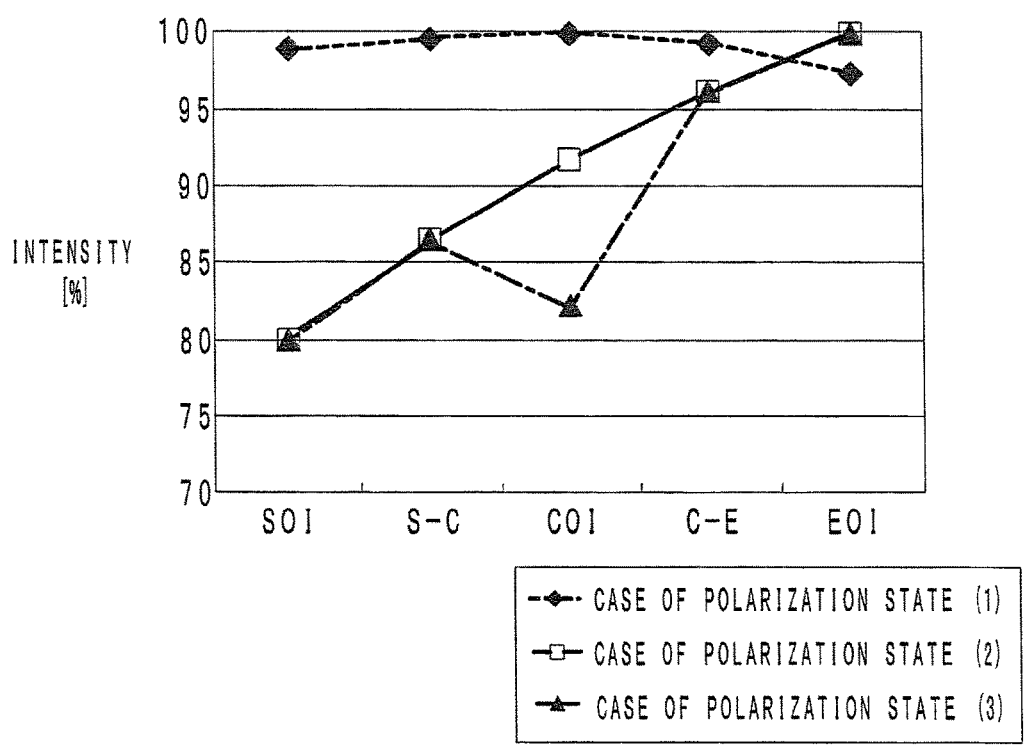
FIG. 21 is a graph showing results of a simulation, which was conducted by using a laser scanning optical system comprising a reflector of a comparative example, of uneven intensity distribution on an imaging surface in different cases of different polarization states of a light beam incident to the reflector of the comparative example.

FIG. 19 is a graph showing results of a simulation of uneven intensity distribution on the imaging surface 69 in different cases of different polarization states of the light beam B. FIGS. 20 and 21 are graphs showing results of simulations of reflectance unevenness and uneven intensity distribution in a laser scanning optical system employing a reflector of a comparative example instead of the reflector 72 in the third embodiment. As will be seen from the comparisons of FIGS. 18 and 19, which show the characteristics of the reflectors 72 in the third embodiment, with FIGS. 20 and 21, which show the characteristics of the reflector of the comparative example, the reflectance unevenness of the reflector 72 in the third embodiment and uneven intensity distribution on the imaging surface 29 in the third embodiment are smaller.

As described above, even when the light beams heading to the both ends (maximum image height positions) of the effective scanning range of the imaging surface 29 enter the reflector 72 at angles of incidence equal to or greater than 55 degrees and less than 69 degrees, it is possible to suppress the reflectance unevenness of the reflector 72.

Figure 22:
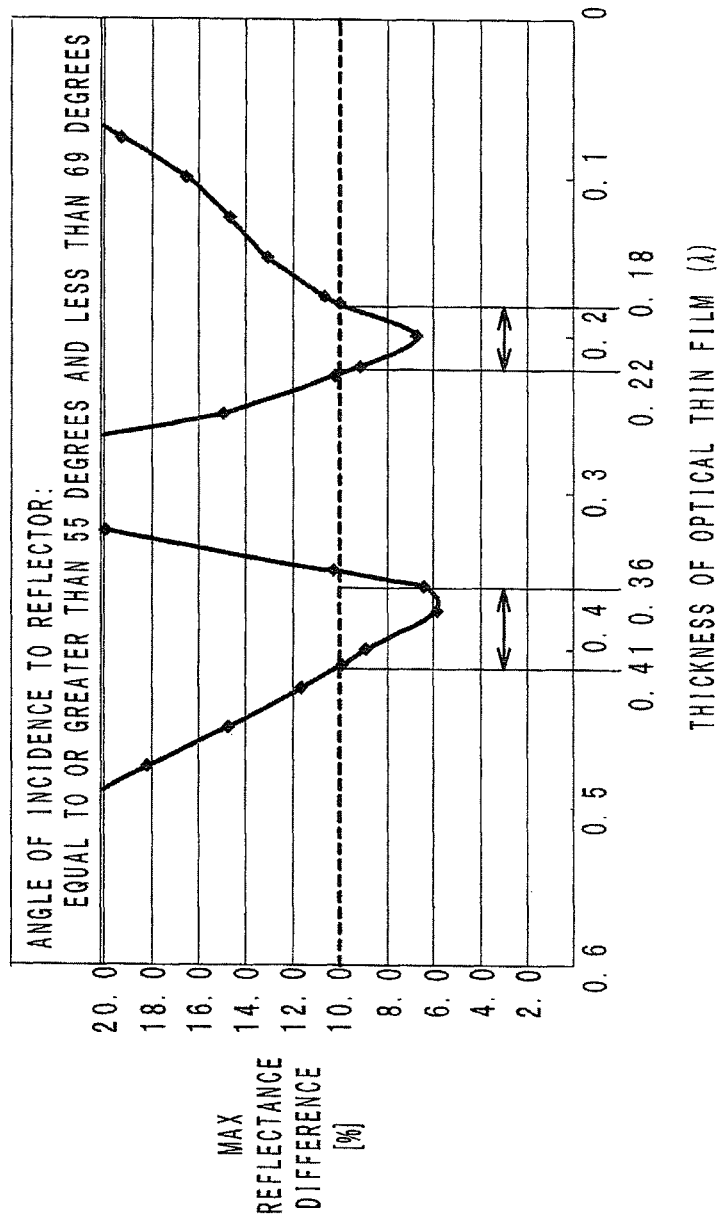
FIG. 22 is a graph showing results of a simulation of reflectance unevenness of the reflector in the third embodiment with the thickness of an optical thin film of the reflector varied while the angle of incidence to the reflector is kept equal to or greater than 55 degrees and less than 69 degrees, the graph showing the maximum reflectance difference in each case of different thicknesses of the optical thin film.

FIG. 22 shows results of a simulation of reflectance unevenness of the reflector 72 with respect to the thickness D of the optical thin film 53 with the angles of incidence of the beams described above kept equal to or greater than 55 degrees and less then 69 degrees, and FIG. 22 shows the maximum reflectance difference. As is apparent from FIG. 22, in order to suppress the reflectance unevenness, the thickness D of the optical thin film 53 shall be set greater than 0.18λ and less than 0.22λ or greater than 0.36λ and less than 0.41λ.

The inventors simulated the reflectance unevenness of the reflector 72 with the thickness D of the optical thin film 53 varied while keeping the angles of incidence of the beams heading to the both ends of the effective scanning range equal to or greater than 55 degrees and less then 69 degrees. FIG. 22 shows results of the simulation. From the simulation results, by setting the thickness D greater than 0.18λ and less than 0.22λ or greater than 0.36λ and less than 0.41λ, the reflectance unevenness can be kept below 10%.

Function and Effect of the Third Embodiment

In the third embodiment, the reflector 72 having a metal film 52 and an evaporated optical thin film 53 is used, and the thickness D of the optical thin film 53 satisfies the condition 0.18λ<D<0.22λ or the condition 0.36λ<D<0.41λ (condition (B') above). Further, the light beams heading to the both ends of the effective scanning range of the imaging surface 69, where the image heights are maximum, enter at angles of incidence equal to or greater than 55 degrees and less than 69 degrees (condition (A') above). Even when a scanning optical element made of a material of great birefringence is used, only if the two conditions (A') and (B') above are satisfied, the reflectance unevenness of the reflector 72 can be kept low, such as below 10%, no matter to what polarization state the scanning lens 71 has changed the light beam B. This suppresses effects of the reflectance unevenness upon uneven intensity distribution on the imaging surface 69.

In the third embodiment, also, the difference between the reflectance for p-polarized light and the reflectance for s-polarized light while the angles of incidence described above are kept equal to or greater than 55 degrees and less than 69 degrees can be kept small, compared with prior art. Accordingly, even when the polarization state of the light beam B changes in different ways depending on the position where the light beam B has passed through the scanning optical lens 71 due to the birefringence distribution of the lens 71, which causes variations in ratio of p polarization to s polarization of the light beam B depending on the angle of incidence to the reflector 72, the reflectance unevenness can be suppressed.

The laser scanning optical system according to the third embodiment has a single scanning lens 71. In this case also, the polarization state of the light beam B changes due to the birefringence distribution of the scanning lens 71, and by using the reflector 72, the reflectance unevenness can be suppressed.

Although the present invention has been described in connection with the preferred embodiments above, it is to be noted that various changes and modifications are possible for those who are skilled in the art. Such changes and modifications are to be understood as being within the scope of the invention.

What is claimed is:

1. A laser scanning optical system comprising:
a light source for emitting a linearly-polarized light beam;
a deflector for deflecting the light beam emitted from the light source;
one or more scanning optical elements for focusing the light beam deflected by the deflector on an imaging surface, wherein the one or more scanning optical elements are arranged downstream of the deflector in an optical path of the light beam; and
one or more reflectors for receiving the light beam that passed through the one or more scanning optical elements and for reflecting the light beam toward the imaging surface, wherein the one or more reflectors are arranged downstream of the deflector and downstream of the one or more scanning optical elements in the optical path of the light beam,
wherein at least one of the one or more scanning optical elements is a lens which is made of a material having a photoelastic coefficient equal to or greater than $20 \times 10^{-12}$ [Pa$^{-1}$];
wherein at least one of the one or more reflectors comprises a basal plate, and a metal film and a single-layer optical thin film evaporated on the basal plate, wherein the at least one of the one or more reflectors has only one optical thin film layer;
wherein the single-layer optical thin film has a thickness D that satisfies a condition 0.36λ<D <0.41λ, wherein λ is a wavelength of the light beam;
wherein the at least one of the one or more reflectors is arranged such that light beams heading to both ends of an effective scanning range of the imaging surface, of which image heights are maximum, enter the at least one of the one or more reflectors at angles of incidence equal to or greater than 55 degrees and less than 69 degrees;
wherein the light source is arranged such that the linearly-polarized light beam heading to a COI (center of imaging) of the imaging surface and its neighborhood has, at the time of entering the at least one of the one or more scanning optical elements, a direction of vibration substantially parallel to a direction of a birefringence axis around the optical axis of the at least one of the one or more scanning optical elements; and
wherein an axis of rotation of the deflector is substantially parallel to a direction of vibration of the linearly-polarized light beam emitted from the light source.

2. A laser scanning optical system according to claim 1, wherein the laser scanning optical system comprises at least two of the scanning optical elements, which are made of a material having a photoelastic coefficient equal to or greater than $20 \times 10^{-12}$ [Pa$^{-1}$], for focusing the light beam deflected by the deflector on the imaging surface.

3. A laser scanning optical system according to claim 1, wherein the at least one of the one or more scanning optical elements has an angle of field equal to or greater than 80 degrees.

4. A laser scanning optical system according to claim 1, wherein each of the one or more reflectors comprises a basal plate, and a metal film and a single-layer optical thin film evaporated on the basal plate.

5. A laser scanning optical system according to claim 1, wherein each of the at least one of the one or more scanning optical elements is made of a material having a photoelastic coefficient equal to or greater than $20 \times 10^{-12}$ [Pa$^{-1}$].

6. A laser scanning optical system according to claim 1, wherein the optical path comprises a plurality of optical paths, wherein the light source and the imaging surface are placed in each of the optical paths.

7. A laser scanning optical system according to claim 1, wherein the optical path comprises one or more optical paths, wherein a single scanning optical element is placed in each of the one or more optical paths.

8. The laser scanning optical system according to claim 1, wherein the metal film is made of aluminum or silver, the optical film is evaporated on the metal film.

9. A laser scanning optical system according to claim 1, wherein the at least one of the one or more scanning optical elements is made of thermoplastic resin.

* * * * *